May 10, 1949.    S. W. JORDAN    2,469,600
VISE WITH QUICK POSITIONING JAWS
Filed Aug. 17, 1945    2 Sheets-Sheet 1
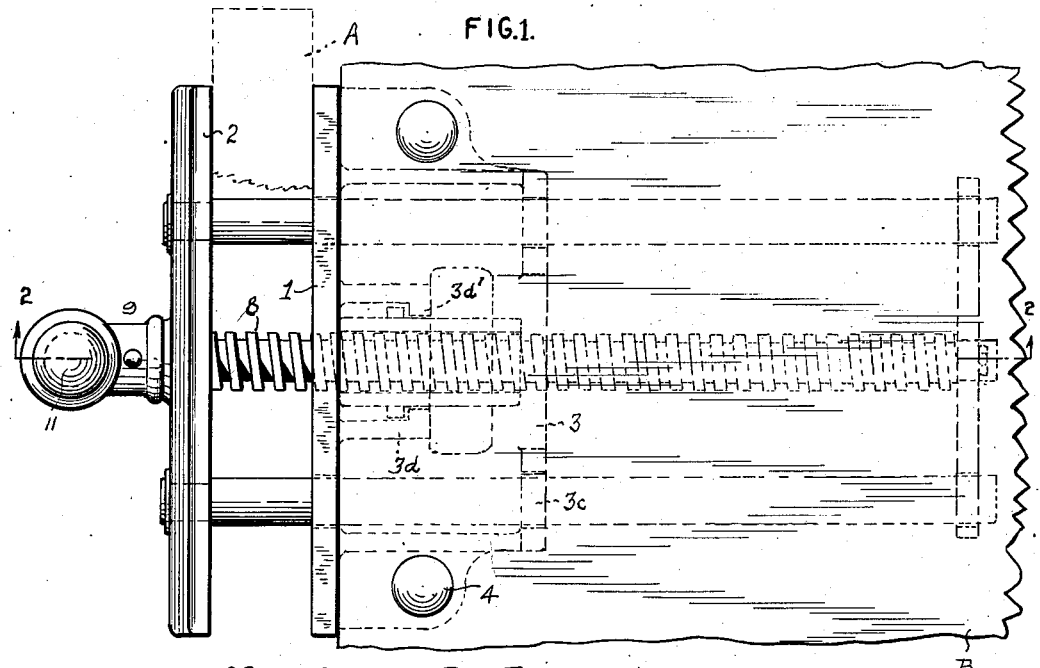
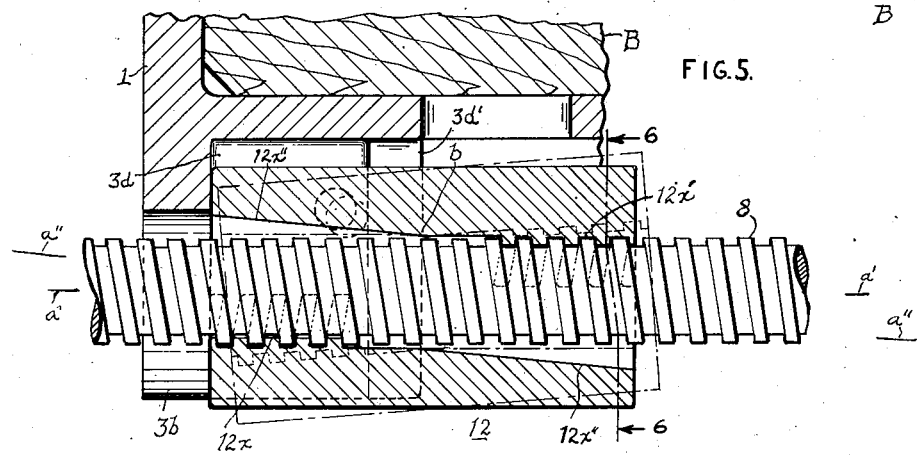
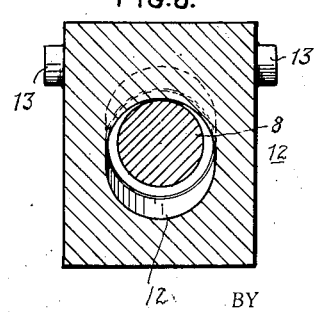
INVENTOR.
SIDNEY W JORDAN.
BY Geo. B. Pitts
Attorney May 10, 1949.　　　　S. W. JORDAN　　　　2,469,600
VISE WITH QUICK POSITIONING JAWS
Filed Aug. 17, 1945　　　　　　　　　　　2 Sheets-Sheet 2
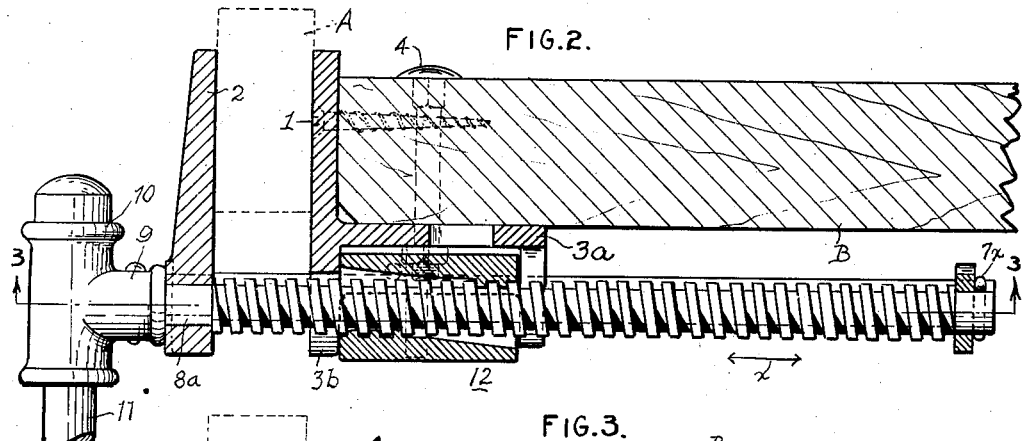
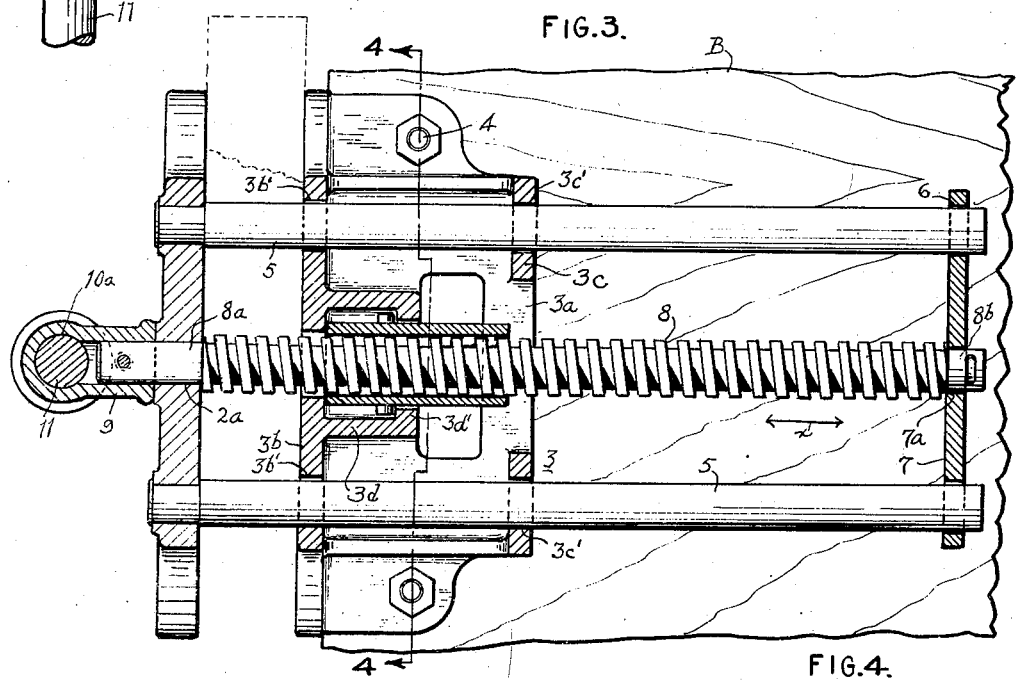
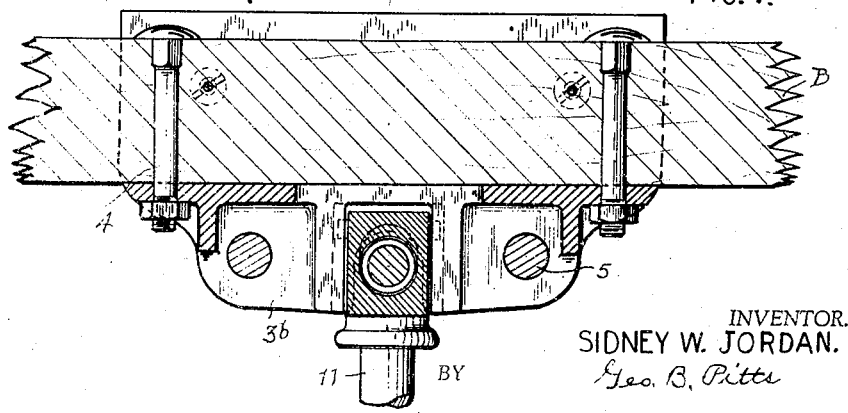
INVENTOR.
SIDNEY W. JORDAN.
BY Geo. B. Pitts
ATTORNEY.

Patented May 10, 1949

2,469,600

UNITED STATES PATENT OFFICE 2,469,600

VISE WITH QUICK POSITIONING JAWS

Sidney W. Jordan, Cleveland, Ohio

Application August 17, 1945, Serial No. 610,927

2 Claims. (Cl. 81—36)

This invention relates to a vise, more particularly to a vise of the quick adjustable type.

Another object of the invention is to provide an improved vise of this type of simple construction and having a minimum number of movable parts one of which consists of a feed screw and the other of which consists of a member having a screw threaded wall, the feed screw being operable to effect a quick positioning of the movable vise jaw or through its connection with said member to provide for the clamping of a work piece between the vise jaws.

Another object of the invention is to provide an improved vise of this type having a feed screw and a member extending longitudinally of and movably mounted on the feed screw between spaced stationary abutments and having a screw threaded portion arranged to engage or disengage the feed screw due to the co-action between one of said abutments and the movable member when the feed screw is rotated.

Another object of the invention is to provide an improved vise of this type having a base, an inner jaw thereon, an outer jaw slidable on the base, a feed screw rotatably carried by the slidable jaw and a hollow member surrounding the feed screw and provided with an internally screw threaded portion movable vertically in the plane of the screw to engage and disengage a threaded portion of the latter.

Another object of the invention is to provide an improved vise of this type the movable jaw of which carries a feed screw, having a rockable member operable in either direction by the feed screw and provided at one end with a screw threaded portion arranged to engage the feed screw when the member is in one position and to disengage the feed screw when it is in its other position, whereby the movable jaw and feed screw are free to move rectilineally.

Another object of the invention is to provide an improved vise of this type consisting of inner and outer jaws, a feed screw carried by the outer jaw and a hollow member surrounding the feed screw and trunnioned thereon and arranged to be rocked in either direction by the rotation of the feed screw, the opposed interior walls at each end of the member being concentric to axes which bisect each other intermediate the ends of the member and the remotely related upper and lower interior walls adjacent the opposite ends of the member being provided with screw threads arranged to engage and disengage the feed screw.

Other objects of the invention will be apparent to those skilled in the art to which my invention relates from the following description taken in connection with the accompanying drawings, wherein Fig. 1 is a plan view of a vise embodying my invention mounted on a support, the jaws clamping a work piece between them.

Fig. 2 is a section on the line 2—2 of Fig. 1.

Fig. 3 is a section on the line 3—3 of Fig. 2.

Fig. 4 is a section on the line 4—4 of Fig. 3.

Fig. 5 is a fragmentary sectional view on the line 2—2 of Fig. 1, enlarged.

Fig. 6 is a section on the line 6—6 of Fig. 5.

In the drawings, 1, 2, indicate the inner and outer jaws of the vise shown clamping a work piece A between them. The jaw 1 is preferably integrally connected to a base, indicated as an entirety at 3. The base 3 preferably consists of a bottom wall 3a having an end wall or flange 3b at its front or outer end and spaced ears 3c on its rearward or inner end. The flange 3b is arranged to serve as an abutment, as later set forth.

3d indicates spaced walls depending from the bottom wall 3a and having inturned alined abutments 3d' spaced from the flange 3b. The purpose of the abutments 3d' will later be set forth. The base bottom 3a may be mounted on the upper side of a support B, but in the preferred construction the jaw 1 extends upwardly in the plane of the wall 3b at right angles to the bottom wall 3a. This exemplified arrangement permits the base 3 to be secured to the underside of the support B by bolts 4, such relationship to the support B being advantageous since (a) the jaw 1 may be positioned in face to face engagement with the side wall of the support B whereby the latter resists pressure exerted inwardly on the jaw 1, and (b) the jaws support work pieces in a plane slightly above the surface of the support B, whereby tools on the support employed for working on the work piece may be readily picked up and replaced thereon.

The jaw 2 is suitably rigidly connected to the outer ends of a pair of spaced parallel guides 5, the inner ends of the guides being preferably supported in openings 6 formed in a cross member 7. Each guide 5 is slidably supported in alined openings 3b', 3c', formed in the flange 3b and adjacent ear 3c, respectively. From the above description it will be observed that the jaw 2, guides 5 and cross member 7 form the movable member of the vise and are movable relative to the jaw 1 and parts connected thereto in the manner later set forth.

8 indicates a feed screw extending parallel to the guides 5 and preferably disposed midway therebetween. The screw is provided with right hand threads, but the operation thereof, as hereinafter set forth would be the same if left hand threads were employed. The outer end portion of the screw 8 is reduced, as shown at 8a and rotatively fits and extends through an opening 2a formed in the jaw 2, the projecting end of the reduced portion 8a being rigidly (preferably removably) connected to the hub 9 of a handle carrying member 10. The handle carrying member 10 is formed with a through opening 10a at right angles to the screw 8 to slidably support a handle 11. The inner end portion of the screw 8 is reduced as shown at 8b and rotatably fits and extends through an opening 7a formed in the cross member 7. The extended end of the reduced portion 8b is preferably formed with a diametrical opening to removably receive a cotter pin 7x. In the preferred arrangement, the terminating ends of the screw threads on the screw 8 provide the shoulders for the reduced ends 8a, 8b, and engage the inner sides of the jaw 2 and cross member 7 to fixedly relate the screw 8, jaw 2, guides 5 and cross member 7, so that by grasping the handle 11 or member 10, this assembly, which constitutes the movable member of the vise (providing the movable connecting element, indicated as an entirety at 12—later referred to—is disengaged from the screw 8), may be freely operated inwardly and outwardly relative to the jaw 1 and base 3, as indicated by the arrows x, whereby the jaw 1 may be translated with a quick movement from one position to another position without rotating the screw 8.

The connecting element 12 is mounted between and freely movable relative to the abutments 3b, 3d' and extends longitudinally of the screw 8 and is shaped to provide outer and inner end portions related to the upper side of the screw 8 and disposed at angles to each other to form between them an apex or transverse trunnion which slidably engages the threads of the screw and on which the element rocks, the inner end portion being provided with screw threads and the outer end portion being threadless. In the preferred form of construction, the element 12 is hollow and (a) provided with an internally screw threaded wall 12x along its outer end portion related to the lower side of the screw 8 and with an internally screw threaded wall 12x' along its inner end portion related to the upper side of the screw 8 and (b) provided with a threadless wall 12x'' opposed to each screw threaded wall 12x, 12x'; the walls 12x, 12x', being concentric to an axis a' and the walls 12x'' being concentric to an axis a'', preferably struck on a radius equal to one-half the outside diameter of the screw 8, which latter axis bisects the axis a' intermediate the ends of the element 12. In this form of construction it will be observed that the outer upper threadless wall 12x'' and inner upper threaded wall 12x' form an apex b (which is in a plane perpendicular to the axis a' and cuts the intersection of the axes a', a'', of the walls 12x, 12x'') fulcrumed on the screw threads of the screw 8, on an axis at right angles to the latter, whereby the element may be rocked in a vertical plane in one direction to effect the engagement of the threaded walls 12x, 12x', with the screw 8 (see full lines in Figs. 2, 5 and 6) or rocked in the opposite direction to effect the disengagement of these walls from the screw 8 (see dotted lines in Fig. 5). As shown in Fig. 6, the lateral terminating ends of each wall 12x, 12x', connects end to end to the lateral terminating ends of the adjacent wall 12x'', such connecting ends forming guide surfaces which slidably engage the opposite sides of the screw to insure rocking movement of the element vertically in the plane thereof. As will be observed, the apex or trunnion b has sliding engagement with the peripheries of the threads of the feed screw 8 when the latter is being rotated or during endwise movement thereof when the outer jaw is being translated from one position to another, without rotating the screw; also, the engagement of the apex or trunnion b with peripheries of the threads on the screw provides a nut-and-screw relation therebetween, so that when the element 12 is in inoperative position and the screw is rotated in the work clamping direction, the element 12 is initially rocked to effect engagement of the threads on the wall 12x' with the threads of the screw 8 and then moved into engagement with the abutment 3b, whereby continued rotation of the screw 8 will operate the movable jaw and clamp any work piece positioned between it and the fixed jaw. 13 indicates studs projecting laterally from opposite sides of the element 12, outwardly of the apex or trunnion b and above the adjacent wall 12x'' and arranged to engage the interior sides of the abutments 3d' when the screw 8 is rotated in the work unclamping direction and be disengaged therefrom when the screw is rotated in the work clamping direction, as later set forth. The apex or trunnion b is disposed midway between the opposite ends of the element 12, but in forming the walls 12x, 12x', 12x'', the inner end of the element 12 is provided with a small amount of metal in excess of the metal on the outer end thereof to slightly overbalance the outer end and studs 13 to insure rocking of the element 12 from its inoperative position to its operative position in threaded relation with the screw 8.

Figs. 1 to 6, inclusive, show the connecting element 12 in screw threaded engagement with the screw 8 and clamping the work piece A between the jaws 1, 2. If now the screw 8 is turned counter-clockwise by the operator, that is, in the work unclamping direction, the initial rotative movement thereof bodily moves the element 12 endwise inwardly (toward the right as viewed in Fig. 5), due to the engagement of the threads on the walls 12x, 12x' with the threads of the screw, thereby moving the studs 13 into engagement with the abutments 3d' whereby the studs act as a fulcrum to rock the element 12 and to arrest the endwise movement thereof, so that continued turning of the screw 8 rocks the element counter-clockwise to the position shown in dotted lines in Fig. 5, and effects the disengagement of the walls 12x, 12x', from the screw. With the element 12 in this latter position the jaw 1 and screw 8 are free to move or be translated in either direction, slowly or with a quick movement at the will of the operator. If now the screw 8 is rotated clockwise, that is, in the work clamping direction, the initial rotative movement thereof, due to the engagement of the apex b with the threads on the screw 8, rocks the element 12 clockwise to effect a meshing of the threads on the walls 12x, 12x' with the threads of the screw 8, which in turn will force the member 12 into engagement with the abutment 3b; and if the operation of the screw 8 is continued the movable jaw 2 will be moved inwardly, whereby a work piece may be clamped as shown in Fig. 1.

It will be noted that when the screw 8 is moved outwardly, the initial movement thereof, due to the frictional engagement of the apex b with the threads of the screw 8 and a resultant force which acts above the center of gravity of the element 12, will overcome the torque caused by the overbalanced inner end and will rock the element 12 counter-clockwise, but the initial inward rectilineal movement of the screw 8, while tending to rock the element 12 in the opposite direction, is prevented from doing so because of the engagement of studs 13 with the abutments 3d'. However, when the screw 8 is moved rectilineally outwardly and the element is rocked as above set forth, the peripheries of the threads on the walls 12x, 12x', move into contact with and slide on the peripheries of the threads on the screw as outward movement thereof continues, so that the threads on the walls 12x, 12x', are unable to intermesh with the threads on the screw. It will thus be observed that the screw 8 and jaw 2 may be moved in either direction without effecting a threaded engagement with the element 12.

From the foregoing description it will be observed that the movable jaw may be quickly moved from any extended position into engagement with a work piece and that by turning the feed screw in work clamping direction the connecting element is moved into engagement with the feed screw whereupon the work piece may be clamped and that by turning the screw in the opposite direction the connecting element is disengaged from the screw, the work piece is released and the movable jaw is free to be moved away from the fixed jaw any desired distance.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. A vise comprising inner and outer jaws, a base for supporting said inner jaw and for slidably supporting said outer jaw, and provided with inner and outer spaced abutments, a feed screw rotatably carried by said outer jaw, a movable member provided with a transversely curved wall extending longitudinally of said feed screw, said inner abutments having vertical wall portions, and said movable member having vertical side walls which slidably engage said vertical wall portions to prevent rotation of said movable member, the opposite end portions of said transversely curved wall being disposed in longitudinally diverging relation to form between them a transversely disposed trunnion engaging the threads on said feed screw to support said member thereon, one of said end portions of said curved wall forming a guide surface slidable over the threads of said feed screw and the other of said end portions being provided with screw threads complementary to the threads on said screw, the rotation of said screw in either direction, first moving said member longitudinally and then rocking said member about the axis of said trunnion, an element projecting laterally from one of said vertical side walls of said member, said element being positioned between said outer and inner abutments and adjacent said inner abutment, the turning of said screw in work clamping direction serving first to move said member longitudinally until it engages said outer abutment and then to rock said member in a direction to engage its threaded end portion with the threads on said screw, the turning of the screw in the work unclamping direction serving first to move said member longitudinally to effect engagement of said element with said inner abutment and then to rock said member in the opposite direction to disengage its threaded end portion from the threads on said screw to permit quick sliding adjustment of said movable jaw.

2. A vise comprising inner and outer jaws, a base for supporting said inner jaw and for slidably supporting said outer jaw and provided with inner and outer abutments, a feed screw rotatably carried by said outer jaw, a hollow movable member surrounding said feed screw, the upper side of the interior wall of said movable member adjacent its inner end and the lower side of said interior wall adjacent its outer end being concentric to a common axis and provided with screw threads arranged to engage and disengage the threads on said screw and the upper side of the interior wall of said hollow member adjacent its outer end and the lower side of said interior wall adjacent its inner end being concentric to a common axis which bisects the axis of said threaded sides of said interior wall, said upper inner and outer sides of said interior wall forming between them a transversely disposed trunnion engaging the threads of said feed screw to support said hollow member thereon, the screw threads of said screw when rotated in either direction being arranged to move said trunnion longitudinally thereof, and a projecting element carried by said hollow member adjacent one of said abutments, the turning of said screw in the work clamping direction serving first to move said hollow member longitudinally and into engagement with the other of said abutments, and then to rock said hollow member in a direction to engage its threaded portions with the threads on said screw, the turning of the screw in the work unclamping direction serving first to move said hollow member longitudinally to effect engagement of said element with the adjacent abutment and then to rock said hollow member in an opposite direction so as to disengage its threaded portions from the threads on said screw.

SIDNEY WM. JORDAN.

REFERENCES CITED

The following references are of record in the file of this patent:

UNITED STATES PATENTS

| Number | Name | Date |
|---|---|---|
| 595,546 | O'Brien | Dec. 14, 1897 |
| 1,042,611 | Schulz | Oct. 29, 1912 |
| 1,096,395 | Schulz | May 12, 1914 |
| 1,125,911 | Periolat | Jan. 19, 1915 |
| 1,243,118 | Trivigino | Oct. 16, 1917 |
| 2,398,941 | Jordan | Apr. 23, 1946 |

FOREIGN PATENTS

| Number | Country | Date |
|---|---|---|
| 587,492 | Germany | Nov. 3, 1933 |